United States Patent [19]

Van Suchtelen et al.

[11] 3,875,409

[45] Apr. 1, 1975

[54] DEVICE FOR CONVERTING AN INPUT QUANTITY OF ONE KIND INTO AN OUTPUT QUANTITY OF ANOTHER KIND

[75] Inventors: Jaap Van Suchtelen; Adrianus M. J. G. Van Rien; Leonardus A. H. Van Hoot, all of Emmasingel, Eindhoven, Netherlands

[73] Assignee: U.S. Philips Corporation, New York, N.Y.

[22] Filed: Sept. 24, 1973

[21] Appl. No.: 399,868

Related U.S. Application Data

[63] Continuation of Ser. No. 296,052, Oct. 10, 1972, abandoned.

[30] Foreign Application Priority Data

Oct. 11, 1971 Netherlands ...................... 7113960

[52] U.S. Cl. ................ 250/370, 250/483, 250/486, 338/15, 357/27, 357/29

[51] Int. Cl. ............................................ G01t 1/10

[58] Field of Search ........... 250/460, 370, 483, 486; 338/14, 15, 18; 317/237, 234 V, 234 Z, 235 AC; 313/499

[56] References Cited

UNITED STATES PATENTS

| | | | |
|---|---|---|---|
| 2,817,783 | 12/1957 | Loebner | 317/235 N |
| 2,870,342 | 1/1959 | Walker et al. | 317/235 N |
| 2,894,854 | 7/1959 | MacIntyre | 250/483 |
| 3,262,059 | 7/1966 | Gunn et al. | 317/235 AC |
| 3,267,405 | 8/1966 | Weiss et al. | 338/32 |
| 3,458,700 | 7/1969 | Kohashi | 260/369 |
| 3,567,946 | 3/1971 | Paul | 250/370 |
| 3,569,895 | 3/1971 | Fujisada | 338/14 |
| 3,584,216 | 6/1971 | Tinney | 250/483 |
| 3,675,018 | 12/1970 | Paul | 250/370 |
| 3,748,480 | 7/1973 | Coleman | 317/235 N |

*Primary Examiner*—Harold A. Dixon
*Attorney, Agent, or Firm*—Frank R. Trifari; Carl P. Steinhauser

[57] ABSTRACT

A device for converting an input quantity X (e.g. a magnetic field) into an output quantity Z (e.g. an electric field) via another quantity Y (e.g. a mechanical force) by means of a composite material consisting of a heterogenous mixture of at least two component phases which statistically periodically alternate one with another throughout the material and are in intimate contact with one another, one phase of which converts X into Y while the other phase converts Y into Z.

7 Claims, 3 Drawing Figures

BEST AVAILABLE COPY

Figures 1, 2:
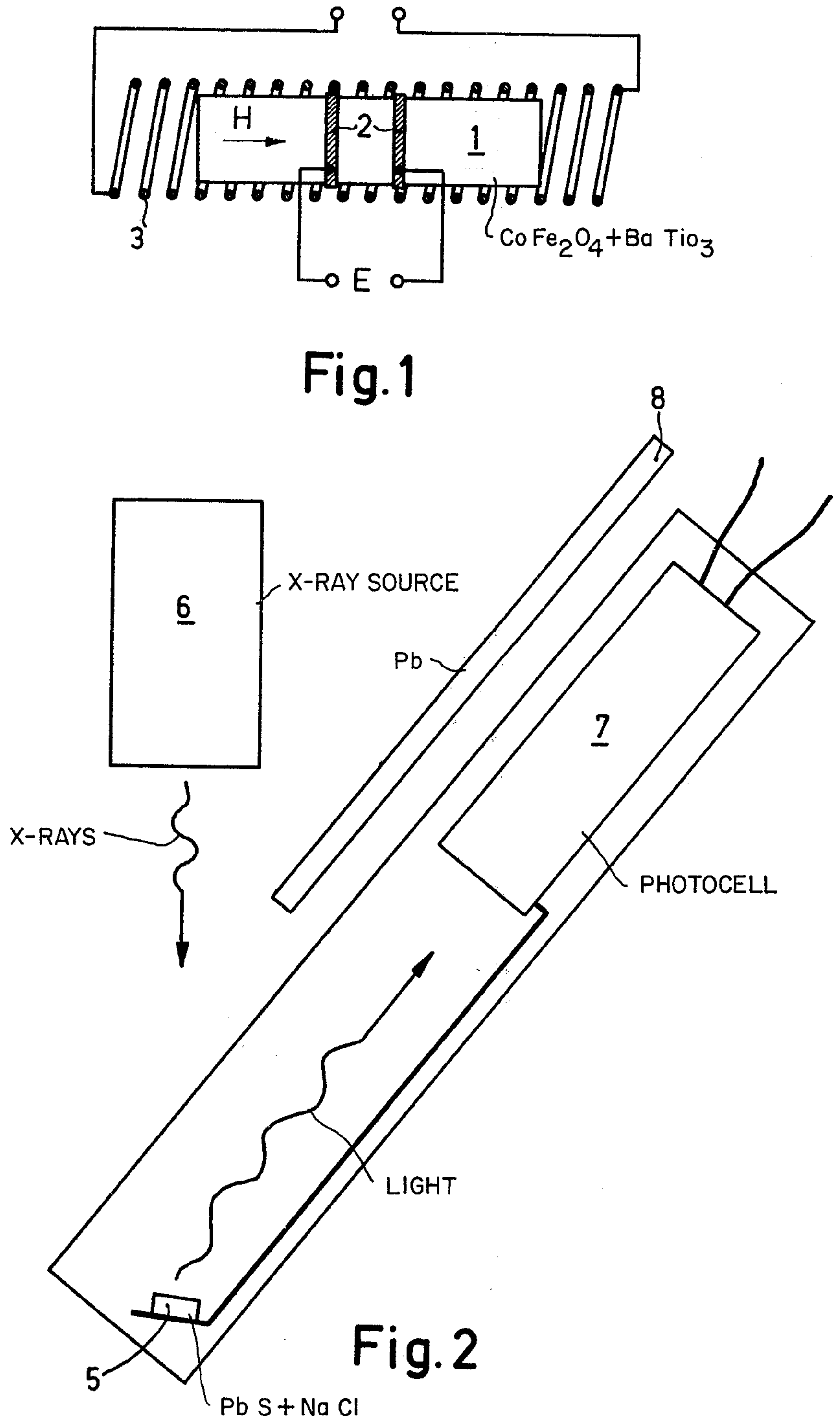

DEVICE FOR CONVERTING AN INPUT QUANTITY OF ONE KIND INTO AN OUTPUT QUANTITY OF ANOTHER KIND

This is a continuation of application Ser. No. 296,052, filed Oct. 10, 1972, and now abandoned.

The invention relates to a device for converting an input quantity into an output quantity (and, as the case may be, vice versa) in which the input quantity X is caused to act on a coupling medium which due to its inherent physical properties brings about the desired conversion into the output quantity Z. Devices of the aforementioned type in which one physical quantity is converted into another one are frequently referred to in the art as "transducers"; the coupling medium of such a transducer has a specific material property which produces the aforementioned conversion. Table I (pages 16 and 17) gives a number of such material properties. In this Table the various input quantities X are shown in horizontal rows and the output quantities Z produced by these input quantities are shown in vertical columns, each crossing showing the physical material property which is responsible for the respective conversion.

Such a conversion may be described by the phenomenological equation $dZ = kdX$, which expresses that a small change $dX$ of the input quantity causes a change $dZ$ of the output quantity. In this expression, $k$ is a proportionality constant, which is referred to as the coupling factor, which in general may be dependent upon many factors, in particular upon X itself. X is sometimes referred to as the driving force — a concept which is not restricted to mechanical forces only, but also includes, for example, electromotive forces and, in general, any causative phenomenon —, while the effect due to this force is referred to as Z. If $k$ depends upon X also, a non-linear phenomenon is concerned.

Although in nature many material properties are known, there is a continuous demand for materials which possess a given property to an increased degree, for materials which are cheaper or more readily available, or for materials having properties which did not exist before. The invention provides a wider choice of materials capable of satisfying this demand. The invention is characterized in that the coupling medium consists of a composite material one component (phase) A of which in itself has the material property that when influenced by the quantity X it generates another physical quantity Y, which quantity Y is transferred, via the material coupling with a second component (phase) B of the composite material, to this second component, which component in itself has the material property of generating the quantity Z under the influence of this quantity Y.

The term "composite material" is used herein to denote a heterogeneous mixture of at least two components or phases which is obtained by bringing a homogeneous phase in a condition such that it divides into the said mixture of phases. Composites are generally obtained by directional solidification from a eutectic, by separation from a eutectoid, by spinodal separation or by separation from a solution, however, in principle they may also be obtained by deposition from a vapour phase or from a solution. An extensive paper on the fabrication of composites is to be found, for example, in "Journal of Metals" June 1967, page 17 seq. Composites have the property that statistically the two phases periodically alternate with one another throughout the entire material. The phases may be in the form of adjacent laminations; one phase may be embedded in the other in the form of needles; one phase may be embedded in the other in the form of articulated laminae. The crystallographic orientation is the same throughout the length of such a lamina or needle. The recurrence interval or period at which the laminae or needles succeed one another may be increased or reduced at will by varying the growth rate. In devices according to the invention this period is made small as compared with the dimensions of a body which is to be manufactured from the coupling medium and serves to perform the desired conversions of the input quantity into the output quantity.

The steps according to the invention considerably increase the choice of media. Devices are known in which by means of a first body made of a transducer material a conversion of one physical quantity X into the other physical quantity Y is effected, whereupon by means of a second body made of another transducer material a conversion of the quantity Y into the quantity Z is effected. However, in such devices the transition from the quantity $Y_1$ produced by the former body to the quantity $Y_2$ received by the latter body frequently involves considerable losses.

If, for example, the former body produces radiation, internal absorption of this radiation may occur owing to the dimensions of this body, with the result that only a small part of the radiation reaches the latter body. The very small dimensions which the laminae or needles may have in the device according to the invention enable these losses to be substantially reduced to zero.

A second difference from such known devices which include discrete transducer bodies consists in that frequently the entire effect produced by the driving force occurs in a single direction in a needle or lamina owing to the monocrystalline orientation, whereas in the known device generally a chaotic directional distribution of the effect produced occurs, which gives rise to considerable losses of the desired effect.

Furthermore it is known to mix finely divided magnetostrictive and piezoëlectric materials and to sinter the mixture, a device being obtained by means of which, for example, an applied magnetic alternating field is converted via mechanical deformations into an electric alternating field. However, in sintered materials, even if they contain a binder, the mechanical deformation of one component is poorly transferred to the other, inter alia because the components make contact with one another through small parts of their surface areas only. Another disadvantage is that such a structure is not in thermodynamic equilibrium, so that in principle aging phenomena are inevitable.

A further disadvantage of sintered bodies is that the constituent particles usually have arbitrary orientations, whereas in a composite material the constituent phase bodies are obtained so as to be monocrystalline and relatively oriented.

Another disadvantage is that in sintered materials the minimum dimension of the phase bodies is determined by the dimensions of the particles of the initial materials which because of the technically available grinding methods generally exceed 1$\mu$m and may be up to 10 $\mu$m. Furthermore, the sintering process naturally results in enlargement of the particle structure, so that exactly the smallest particles disappear. In contradistinction thereto, in composites grown in situ the dimensions of the phase bodies are determined at will by controlling the conditions of growth, while the period may, if desired, be less than 1 $\mu$m An advantage, which by the way the device according to the invention has in common with the last-mentioned known device, is that the coupling medium may be used in the form of a body of substantially arbitrary dimensions, which greatly simplifies the problems of matching to devices for supplying the quantity X and for deriving the quantity Z. Obviously the dimensions of the coupling member must be considerably greater than the smallest dimension of the phase bodies, but this condition can as a rule readily be satisfied by composite materials.

In the device according to the invention another category of effects is aimed at than with the known composite materials. In the latter what are referred to as sum properties are aimed at: the applied force divides between the various phases from which the composite is made and in these produces effects which differ between the two phases not in nature but only in value. Thus a property is concerned which both the composite material and each of the constituting phases possess, although in different degrees. Consequently material properties of the two phases are combined to form a kind of arithmetic mean property. For example, known composite materials of high strength and low weight are made from two components one of which is exceptionally strong while the other is exceptionally light, so that the composite material made from them combines a high material strength with a low specific weight.

Also devices referred to as "Feldplatte" (field plate) are known in which metallic needles are embedded with a predetermined orientation in a body of a semiconductor material. By means of electrodes applied to the body, a current can be made to flow through it in a direction at right angles to the needle direction. A magnetic field applied at right angles both to the current direction and to the needle direction will tend to deflect the current in a direction parallel to the needle direction and will produce a Hall voltage. However, the needles form a short circuit for this Hall voltage, so that a large resistance variation as a function of the magnetic field is produced between the said electrodes. In this type of device also the anisotropic conductivity of the body is a kind of arithmetic mean of the conductivity of the two phases — the semiconductor material and the needles.

In contradistinction thereto in the device according to the invention another category of effects is utilized, i.e. the effects of the product properties: one component brings about a conversion of one physical quantity (input quantity) into another one; the other component brings about a conversion of this other physical quantity into a third one (output quantity). The first conversion may be described by the equation: $dY_1 = k_1 dX$; the second conversion may be described by the equation: $dZ = k_2 d Y_2$. Owing to the intensive physical coupling between the phases in a device according to the invention hardly anything of the effect $Y_1$ produced by the one component is lost in the form of a force $Y_2$ acting on the second component, so that in practice it may be assumed that $Y_2 = Y_1$. The conversion of the entire device may then be written as: $dZ = k_1 k_2 dX$, so that the aforementioned coupling factor $k$ is equal, or at least very closely approximates, to the product of the coupling factors $k_1$ and $k_2$ which express the aforementioned partial conversions.

Obviously at least one of the components may additionally bring about a direct conversion of the quantity X into the quantity Z, in which case the conversion based on the aforementioned product property $k_1 k_2$ is added to the direct conversion of the said one component. The invention is limited to the cases where the conversion based on the product property plays the chief part in, or at least provides an appreciable contribution (for example of more than 10 percent) to, the conversion of X into Z.

On the other hand, the quantities X and Z may be of the same nature, for example of the nature of electromagnetic radiation. Thus, for example, a body may be made of a composite material in which one phase comprises semiconductive needles having photoconductive properties which are embedded in a matrix of the other phase which has electroluminescent properties. The photoconductive material is selected so that the effective impedance of the needles in the non-illuminated condition is greater, and in the illuminated condition is smaller, than that of the surrounding matrix. On application of an electric field in the direction of the needles the electric field in the matrix will be concentrated at the points of the needles, if, and only if, at the same time the composite material is illuminated. The resulting field strength at the needle ends may then be raised to a value such that the electroluminescent matrix material emits light. Thus, in this case the product property consists in that the incident electromagnetic radiation produces a variation of the current density in one phase by the variation of the resistivity of this phase. This variation in current density is imparted to the matrix material, where it causes the emission of light via the resulting increased electric field.

In practice, to obtain a suitable device according to the invention there are selected from the arsenal of transducer materials which produce a conversion of the quantity X into the quantity Y with a fairly high coupling factor $k_1$ and from the arsenal of transducer materials which produce a conversion of the quantity Y into the quantity Z with a fairly high coupling factor $k_2$ a pair of transducer materials which will not chemically react with one another, permitting a two-phase system to be formed which is in thermodynamic equilibrium, for example by directional solidification of a homogeneous mixture of these components from the eutectic or by directional separation from a eutectoid or from a liquid solution, so that the composite may grow therefrom in situ. Special attention must be paid to ensure not only that the transducer action of one component of such a pair is not, or not excessively, interfered with by the other component, but also that the quantity X (or Z) to which the component A is to respond (or which the component B is to supply respectively) is not, or not excessively, interfered with by the presence of the other component B (or A) respectively, in other words, the components A and B are to be more or less transparent to the quantities Z and X respectively. Owing to all these additional conditions, in practice it is not sufficient to consider only those components which have the highest coupling factors $k_1$ or $k_2$, but a pair of components each having a slightly lower coupling factor but which complies better with the other conditions may give better results.

The obtained composite usually has a regular structure, in which either the two phases alternate with one another in the form of platelets or laminae, or one phase is present in the form of regularly distributed needles or articulated laminae. The division is extremely fine and hence, viewed macroscopically, homogeneous — the thickness of the laminae or needles and consequently the periodicity interval of the structure may even be of the order of from 0.1 to 0.01 $\mu$m, which also provides very intensive coupling between the two phases, while the spontaneous in situ growth permits a chemical equilibrium to be established, so that the likelihood of aging phenomena is considerably reduced.

The invention will now be described more fully with reference to two exemplary embodiments.

The first embodiment relates to a device for converting an electric field into a magnetic field or vice versa, i.e. a conversion which can be directly performed by only very few natural materials. The second embodiment relates to a device for converting a short-wavelength electromagnetic radiation into a long-wavelength electromagnetic radiation, in which device one of the components of the composite material itself provides such a conversion to a certain extent, it is true, but in which the presence of the other component, via a conversion of the short-wavelength radiation into fast electrons which in turn produce long-wavelength radiation, provides an appreciably increased production of the latter radiation.

Figure 3:
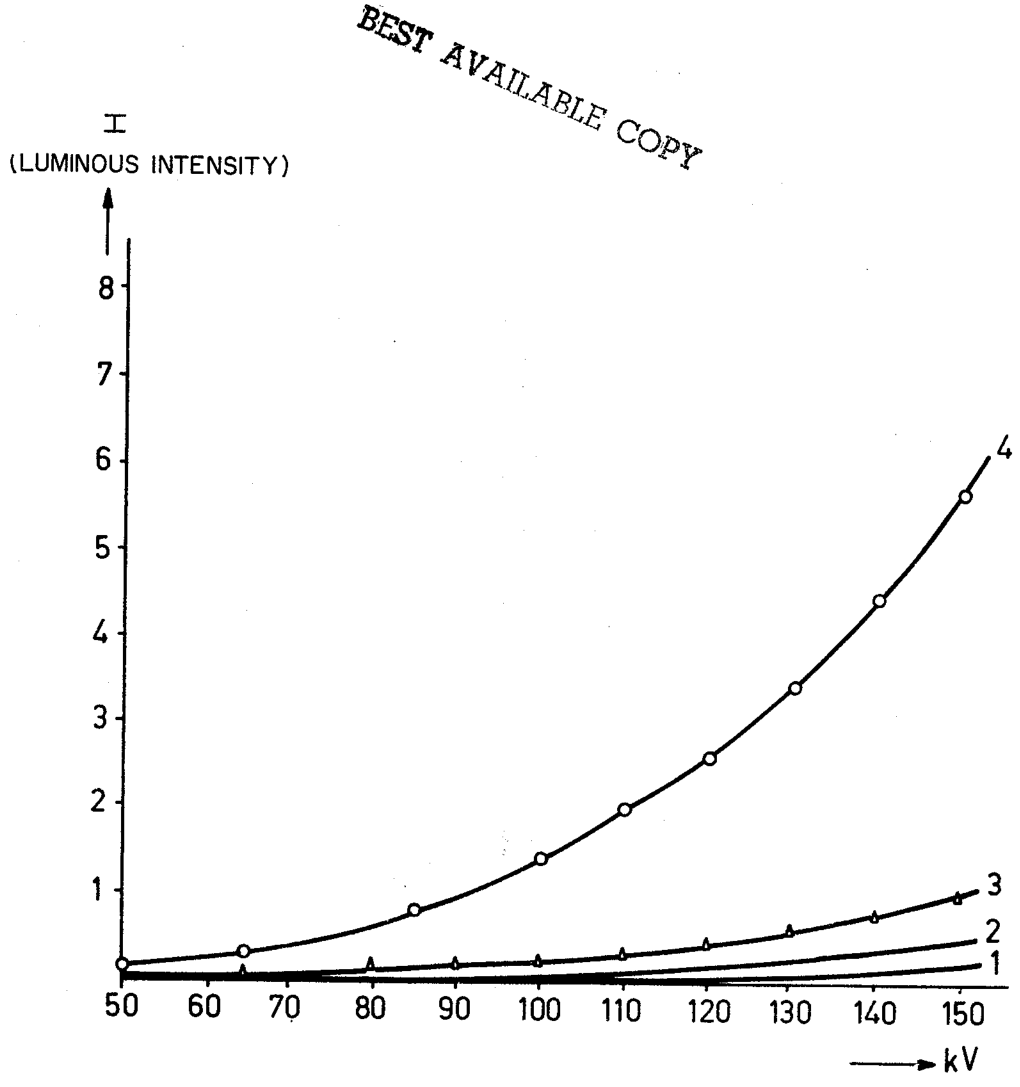

FIG. 1 of the accompanying diagrammatic drawings shows schematically an implementation of the said first embodiment, FIG. 2 shows schematically an implementation of the second embodiment, and FIG. 3 shows measurements made on a device as shown in FIG. 2.

In the first embodiment a powdered mixture of 38 molar % of $CoFe_2O_4$ and 62 molar % of $BaTiO_3$ was intimately mixed, then melted and subsequently homogenized in a platinum capsule at a temperature of 1,400° C for several hours. The mixture was then solidified by lowering the capsule at a rate of 20 cm per hour into colder surroundings (Bridgman technique). The ensuing temperature gradient in the material was 100° C per cm, but was not critical at all. This technique provided a composite of laminar structure having a period of about 1 $\mu$m.

From the resulting material a rod (1 in FIG. 1) was made having a length of 38 mm and a diameter of 8 mm. The rod was provided with annular electrodes 2 spaced from one another by a distance of 2.5 mm, after which the rod was inserted into a solenoid 3 by means of which a variable magnetic field H was produced. This variable magnetic field produces internal stresses in the cobalt ferrite because of the magnetostrictive properties thereof, and owing to the physical coherence of the phase bodies in the rod these stresses are transferred to the barium titanate. Owing to the piezoelectric properties of this barium titanate, the mechanical stresses are converted into an electric voltage E which can be measured at the electrodes 2. Conversely, the application of an electric voltage to the electrodes 2 enables a variable magnetic field to be produced. Owing to the finely divided structure and the intimate coupling between the cobalt ferrite and the barium titanate hardly any mechanical energy is lost, whereas, if the two components in the form of sintered particles were in contact with one another, as the case may be via a binder, a large part of the mechanical energy produced would be lost.

In the second embodiment a composite was made from the components NaCl and PbS by the Bridgman method. The starting material consisted of 97% by weight of NaCl and 3 % by weight of PbS in finely divided form which were intimately mixed, then melted and subsequently homogenized at a temperature of 900° C for several hours. The melt, which was contained in an evacuated capsule of vitreous silica, was then solidified by lowering the capsule into colder surroundings at a rate of 10 cm per hour. In this case also, the temperature gradient in the material was not critical at all.

The resulting composite has a needle structure of PbS needles in a matrix mainly consisting of NaCl. From the composite material a plate 5 (FIG. 2) was made which had a thickness of 0.9 mm and a surface area of 0.25 $cm^2$. This plate 5 was exposed to hard X-radiation having a wavelength of the order of 0.1 A emitted by a source 6, the long wavelength radiation produced being detected by means of a photocell 7 which was shielded from the source 6 by a lead plate 8.

It was found that the long-wavelength electromagnetic radiation produced had a considerably higher intensity than is found when common salt alone is exposed to hard X-rays. Because the X-radiation liberates fast electrons in the lead sulfide and the free electrons are not re-absorbed in the PbS owing to the small dimensions (thickness about 1 $\mu$m, length about 10 $\mu$m, period about 10 $\mu$m) of the PbS particles, but emerge from the PbS and enter the NaCl matrix, these electrons excite the common salt, causing an emission of visible light which is about 10 times that which is produced by a common salt crystal of the same dimensions and under the same conditions.

A similar effect, obtained by measurements taken on a composite of the phases NaCl and $Bi_2O_3$ obtained from a melt of 85 % by weight of NaCl and 15 % by weight of $Bi_2O_3$ which was homogenized at 900° C, is shown in FIG. 3. In this Figure, curve 2 represents the intensity of the long-wavelength light produced in a NaCl crystal of thickness $5.10^{-2}$ cm and surface area 0.24 $cm^2$ and observed at an angle of 45° both to the surface and to the X-radiation normally incident thereon. Curve 3 shows the intensity produced by a crystal of the same dimension consisting of NaCl supersaturated with 0.1% by weight of $Bi_2O_3$. Curve 1 is the luminous intensity of a crystal of the same dimensions consisting of 99.9% by weight of $Bi_2O_3$ and 0.1 % by weight of NaCl, whilst curve 4 represents the light produced by the aforedescribed composite plate, all these intensities being shown as functions of the energy of the incident X-radiation.

TABLE I

| | X | Mechanical K/Δl | magnetic H/M | electric E/P; i | optic or particles luminous flux or particle stream | thermal T, grad T heat current |
|---|---|---|---|---|---|---|
| | mechanical K/Δl | elasticity (M,P,T) | 1) magneto-striction 2) +K : E(M) | 1) electro-striction 2) +K : E(P) 3) (indirect) thermal expansion | | thermal expansion |
| | Magnetic H/M | 1) piezo-magnetism 2) $\mu$ (Δl) (especially with $T \approx T_c$) | X (Δ l, T, luminous flux) | 1) superconductivity $i \sim i_c$ 2) direct generation of magnetic field | photomagnetic effect | +H ferromagnetic material at $T \approx T_c$ |
| Z | Electric E/P; i | 1) piezo-electricity) 2) piezo-resistance effect | 1) +i magneto-resistance 2) +i Hall-effect 3) voltage induction 4) resonance effects with alternating fields | $\epsilon$, $\rho$ (Δ l, M, T, luminous flux) +H Hall effect | 1) photo-conduction 2) photoemission 3) ionisation | 1) thermo-electric effect 2) +E ferro-electric at $T \approx T_c$ 3) +i $\rho$(T) |
| | optic or particles luminous flux or particle stream | 1) stress birefringent 2) triboluminescence | 1) Faraday effect 1) magneto-optic Kerr effect | 1) electro-luminescence 2) n(E) 3) Kerr effect 4) laser emission at interface 5) cold emission of electrons | n (Δl, M, P, T, E) fluorescence scintillation activation of colour centres | thermo-luminescence |
| | thermal t, grad t heat current | 1) heat of transition of phase transition produced by pressure. 2) piezo-resistance effect + heating by electric current | 1) adiabatic demagnetisation 2) +i grad T (NE-effect) 3) +E magneto-resistance effect + heating by electric current | 1) dissipation in resistor 2) Peltier effect 3) +H grad T NE effect (Nernst-Ettinghausen) | absorption | λ |

What is claimed is:

1. A device for converting a first physical quantity X into a second physical quantity Z comprising a body of a composite material consisting of a heterogenous mixture of at least two phases derived from a single homogeneous phase, one of said phases having the property of producing a third quantity Y in response to the quantity X and another of said phases having the property of producing the physical quantity Z in response to the quantity Y, means to produce the first physical quantity, means to couple said first physical quantity producing means to said body, and means to couple said body to means for reproducing said physical quantity Z.

2. A device as claimed in claim 1, wherein the phases of the composite material alternate with a period of less than 10 microns.

3. A device as claimed in claim 2 in which the composite material has a period less than 1 micron.

4. A device as claimed in claim 1, for converting a magnetic field into an electric field and/or vice versa, wherein the composite material consists of a phase which produces a mechanical force in response to a magnetic field and vice versa and a phase which produces an electric field in response to a mechanical force and vice versa.

5. A device as claimed in claim 4 in which the phase which produces an electric field in response to a mechanical force is Ba $TiO_3$.

6. A device as claimed in claim 1 for converting short-wavelength radiation into long-wavelength radiation, wherein the composite material contains a phase which produces fast electrons from the short-wavelength radiation and which is embedded in a phase which converts the energy of these fast electrons into the long-wavelength radiation.

7. A device as claimed in claim 6 in which the fast electron producing phase is Pb S and the phase which converts fast electrons into long-wavelength radiation is NaCl.

* * * * *

PO-1050
(5/69)

UNITED STATES PATENT OFFICE
CERTIFICATE OF CORRECTION

Patent No. 3,875,409 Dated April 1, 1975

Inventor(s) JAAP VAN SUCHTELEN ET AL

It is certified that error appears in the above-identified patent and that said Letters Patent are hereby corrected as shown below:

On the title page, section [75] change as follows:

"Adrianus M.J.G. Van Rien" to read --Adrianus M.J.G. Van Run--;

"Leonardus A.H. Van Hoot" to read --Leonardus A.H. Van Hoof--.

Signed and Sealed this twenty-second Day of July 1975

[SEAL]

Attest:

RUTH C. MASON
*Attesting Officer*

C. MARSHALL DANN
*Commissioner of Patents and Trademarks*